United States Patent
Pohl

(10) Patent No.: US 12,108,914 B2
(45) Date of Patent: Oct. 8, 2024

(54) SYSTEM WITH FOOD PROCESSOR AND HOUSEHOLD MIXING DEVICE

(71) Applicant: Vorwerk & Co. Interholding GmbH, Wuppertal (DE)

(72) Inventor: Stephan Pohl, Wuppertal (DE)

(73) Assignee: Vorwerk & Co. Interholding GmbH (DE)

( * ) Notice: Subject to any disclaimer, the term of this patent is extended or adjusted under 35 U.S.C. 154(b) by 869 days.

(21) Appl. No.: 17/211,441

(22) Filed: Mar. 24, 2021

(65) Prior Publication Data

US 2021/0298532 A1    Sep. 30, 2021

(30) Foreign Application Priority Data

Mar. 26, 2020   (EP) .................................. 20165974
May 19, 2020    (EP) .................................. 20175328

(51) Int. Cl.
*A47J 43/08*    (2006.01)
*A47J 43/046*   (2006.01)
*A47J 43/07*    (2006.01)

(52) U.S. Cl.
CPC ......... *A47J 43/085* (2013.01); *A47J 43/0465* (2013.01); *A47J 43/0766* (2013.01)

(58) Field of Classification Search
USPC ....................................................... 241/101.8
See application file for complete search history.

(56) References Cited

U.S. PATENT DOCUMENTS

| | | | | |
|---|---|---|---|---|
| 5,875,706 | A | * | 3/1999 | Borger ................... A47J 43/087 366/291 |
| 2009/0285958 | A1 | * | 11/2009 | Garcia .................... A47J 36/32 366/601 |
| 2016/0038947 | A1 | * | 2/2016 | Golino ................... A47J 43/046 241/199.12 |

FOREIGN PATENT DOCUMENTS

| | | | |
|---|---|---|---|
| CH | 702302 | | 5/2011 |
| CN | 205493487 U | * | 8/2016 |
| CN | 109381064 | | 2/2019 |
| DE | 102009016897 | | 10/2010 |
| DE | 202014101885 | | 8/2014 |
| EP | 0832594 | | 4/1998 |
| EP | 1639928 | | 3/2006 |
| EP | 2269494 | | 1/2011 |
| WO | WO-2014201509 A2 | * | 12/2014 ............. A47J 44/00 |

OTHER PUBLICATIONS

Vorwerk International Strecker & Co., User Manual Thermomix TM6, V2.0-Digital Manual, 43 pages.

* cited by examiner

*Primary Examiner* — John J Norton
(74) *Attorney, Agent, or Firm* — Barnes & Thornburg LLP

(57) ABSTRACT

The present disclosure relates to a system comprising a food processor and a mixing device having at least one vessel with a mixing tool. The vessel can be both part of the food processor and part of the mixing device. The maximum possible rotational speed at which the food processor can rotate the mixing tool may be at least five times greater than the maximum possible rotational speed at which the food processor can rotate the mixing tool. The present disclosure also relates to a stand part for the mixing device of the system. The stand part may be configured to rotate the (Continued)

Figure 1:
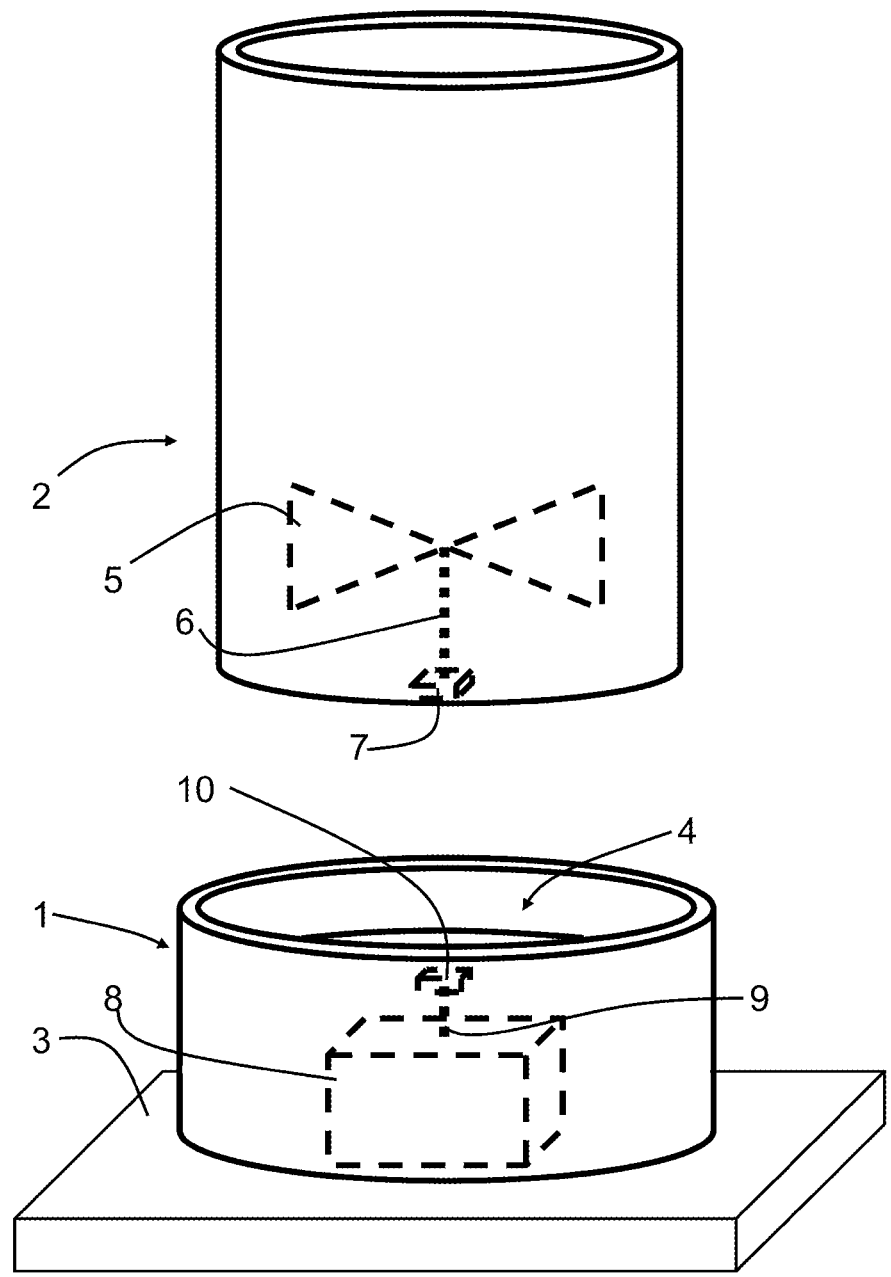

mixing tool at or below a predetermined rotational speed as well as at or below a predetermined torque level.

18 Claims, 9 Drawing Sheets

SYSTEM WITH FOOD PROCESSOR AND HOUSEHOLD MIXING DEVICE

CROSS REFERENCE TO RELATED APPLICATIONS

This application claims priority to and the benefit of European Patent Application Numbers 20165974.5, filed 26 Mar. 2020, and 20175328.2, filed 19 May 2020, the disclosures of which are now expressly incorporated herein by reference.

FIELD OF THE DISCLOSURE

The present disclosure relates to a system for a household, in which the system includes a food processor and a mixing device. The disclosure also relates to a stand part for the mixing device.

BACKGROUND

From the publication EP 1 639 928 A1 a food processor with a vessel is known. The vessel comprises a set of knives. The food processor can chop, grind or merely mix ingredients of a food which are in the vessel. In order to be able to chop ingredients of a food, the set of knives must be able to be rotated with high rotational speed and high torque in the direction of its sharp edge. The electric drive of such a food processor is selected to be correspondingly powerful.

An agitator for a food processor with a permanent synchronous motor is known from the publication CH 702 302 A2. The permanent synchronous motor comprises a plurality of permanent magnets arranged at regular intervals around the circumference of the rotor of the electric motor.

Known is an instruction manual "THERMOMIX® TM6 of the company VORWERK INTERNATIONAL STRECKER & CO. 02/19", which discloses a food processor with a removable vessel. There are various accessories for the vessel such as a cooking insert, a Varoma® container, a Varoma® insert bottom, a mixing attachment to be able to prepare many different foods.

A food processor can perform a variety of operations such as mixing, chopping and heating. Accordingly, it can be used to prepare a wide variety of different foods. In particular when using a versatile food processor, there can be a need to have more than one vessel. If a food is prepared in a first vessel, a second vessel can be used for parallel preparation of a second food without the need for transferring or cleaning a vessel in between.

A mixing device comprising a vessel and a mixing tool is known from the publication DE 10 2009 016 897 A1. The mixing tool is integrated into a top piece for the vessel. The top piece comprises as a drive a piezo stepper motor. A piezo stepper motor is relatively small and light.

When preparing one or more foods, there is regularly a need to mix first ingredients and to chop and/or mix second ingredients. If only one food processor is provided, these steps must be performed one after the other. By providing a second food processor, this problem could be solved. However, providing a second food processor to solve the problem is not very practical, since the full potential of such a food processor must be exploited simultaneously too infrequently.

SUMMARY

The teaching of the present disclosure is intended to simplify and accelerate the preparation of a food with a reasonable technical effort.

Disclosed is a system comprising a stand part of a food processor and a stand part of a mixing device and at least one vessel with a mixing tool located therein. The vessel can be used both as part of the food processor and as part of the mixing device. By this it is meant that the vessel can be inserted into the stand part of the food processor and is then initially part of the food processor. However, the vessel can be removed from the stand part of the food processor and inserted into the stand part of the mixing device. The vessel is then part of the mixing device. It is thus possible to use the vessel as part of the food processor first and then as part of the mixing device later, or vice versa, depending on requirements, even during preparation of a food. If the same ingredients are to be processed, there is no need to transfer the ingredients from the vessel of a food processor to the vessel of a mixing device or vice versa.

The food processor may be configured such that the mixing tool can be rotated by the food processor at higher rpm compared to the maximum rpm possible with the mixing device. Because the mixing device in this embodiment does not require a large motor due to the low rpm, it is possible to build the stand part of the mixing device particularly small compared to the stand part of the food processor. The space required for the stand part of the mixing device in addition to the space required for the food processor is therefore small.

BRIEF DESCRIPTIONS OF THE DRAWINGS

The figures show

Figure 2:
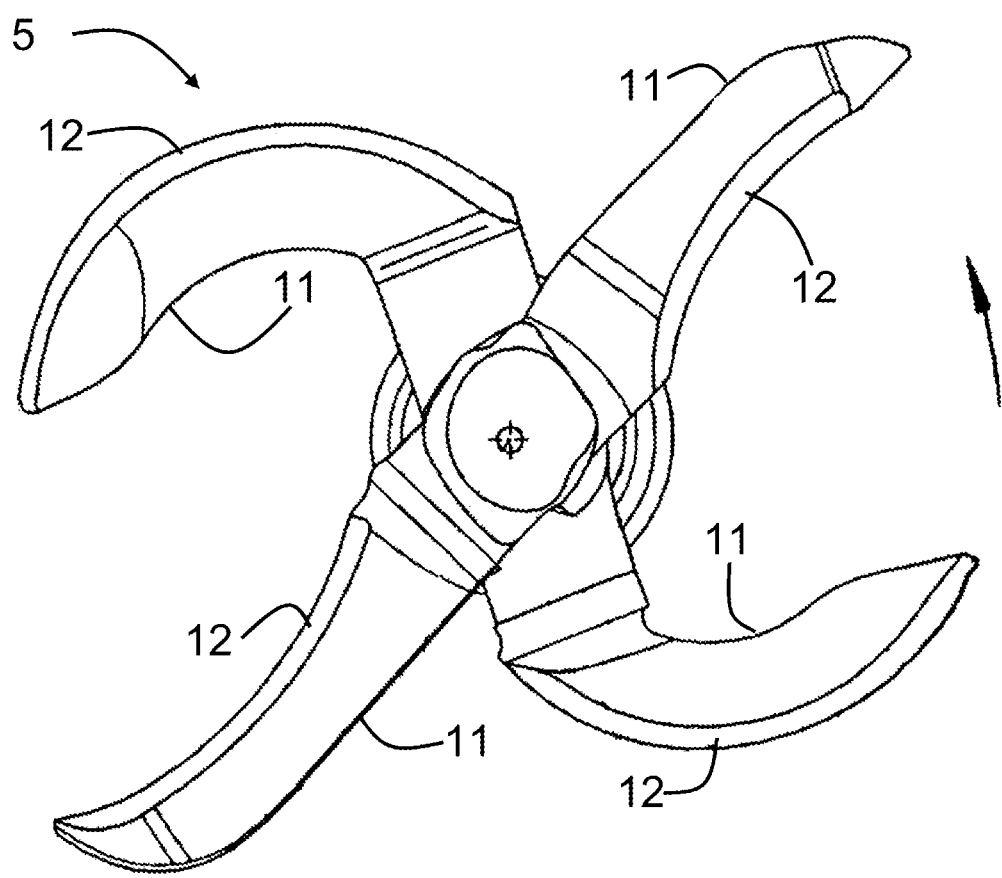
Figure 3:
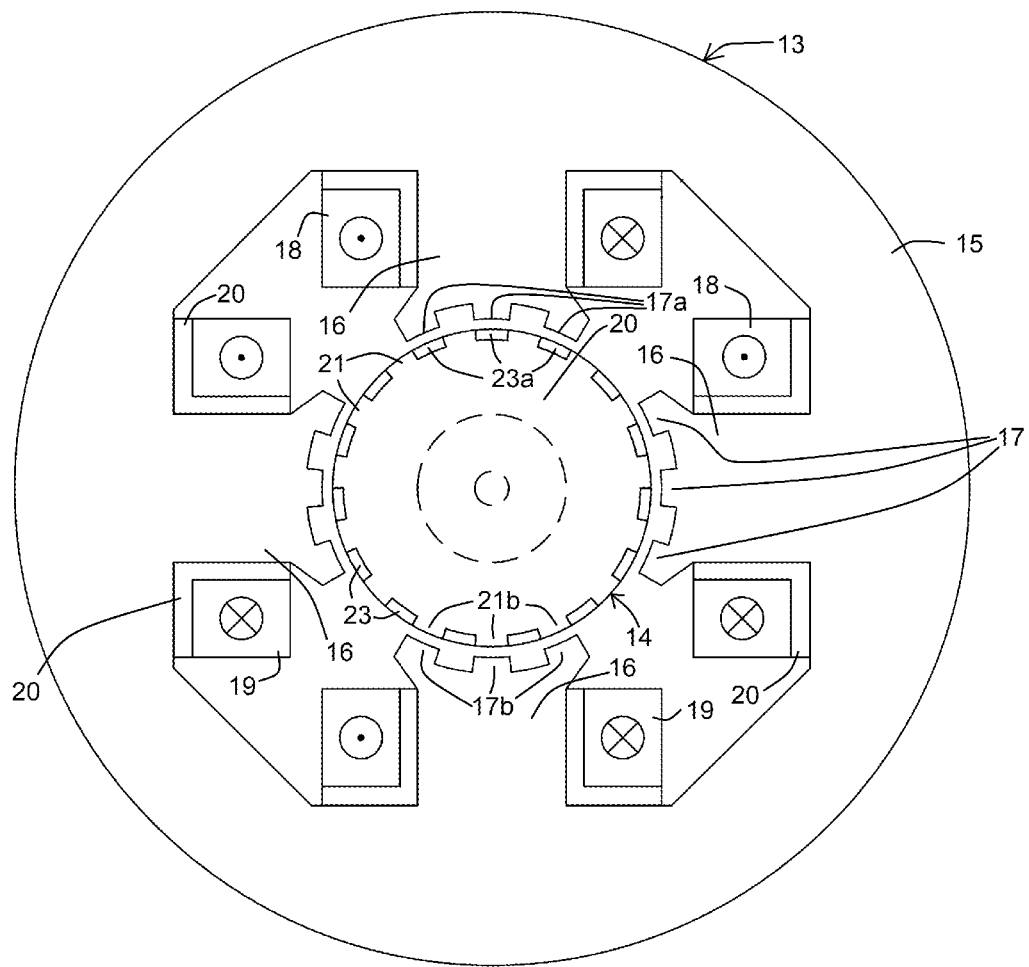
Figure 4:
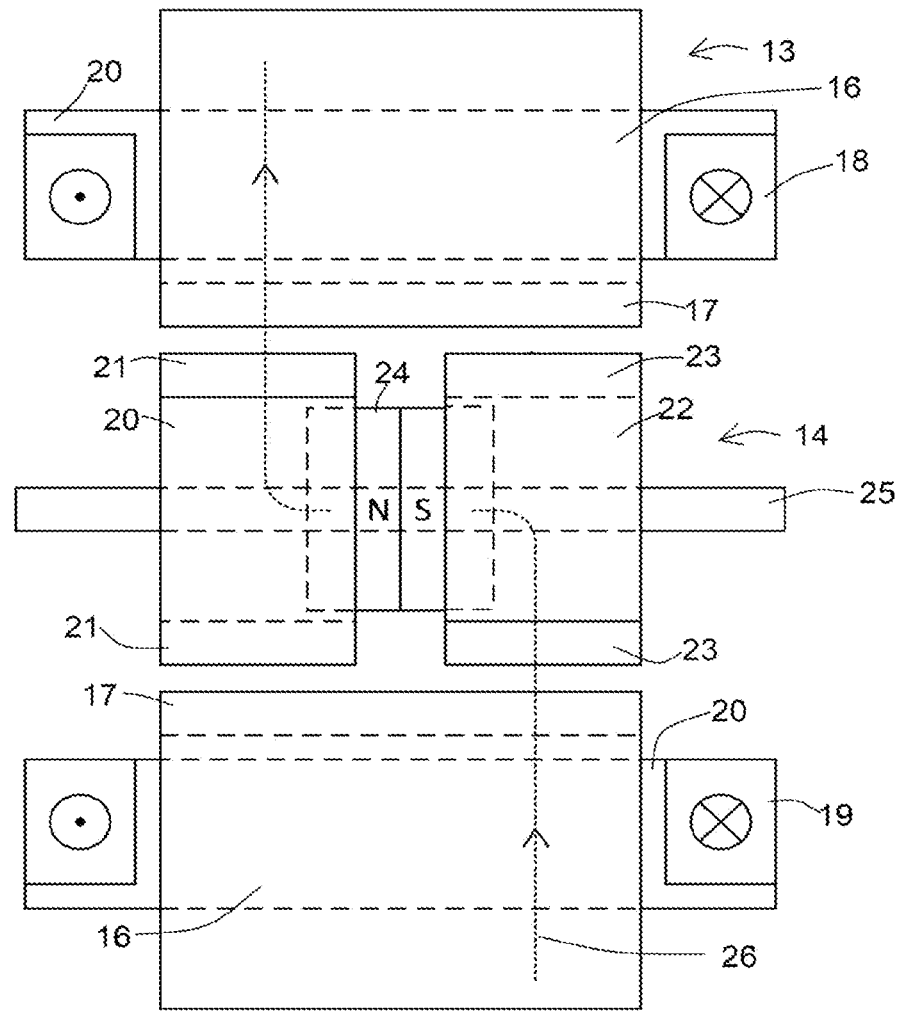
Figure 5:
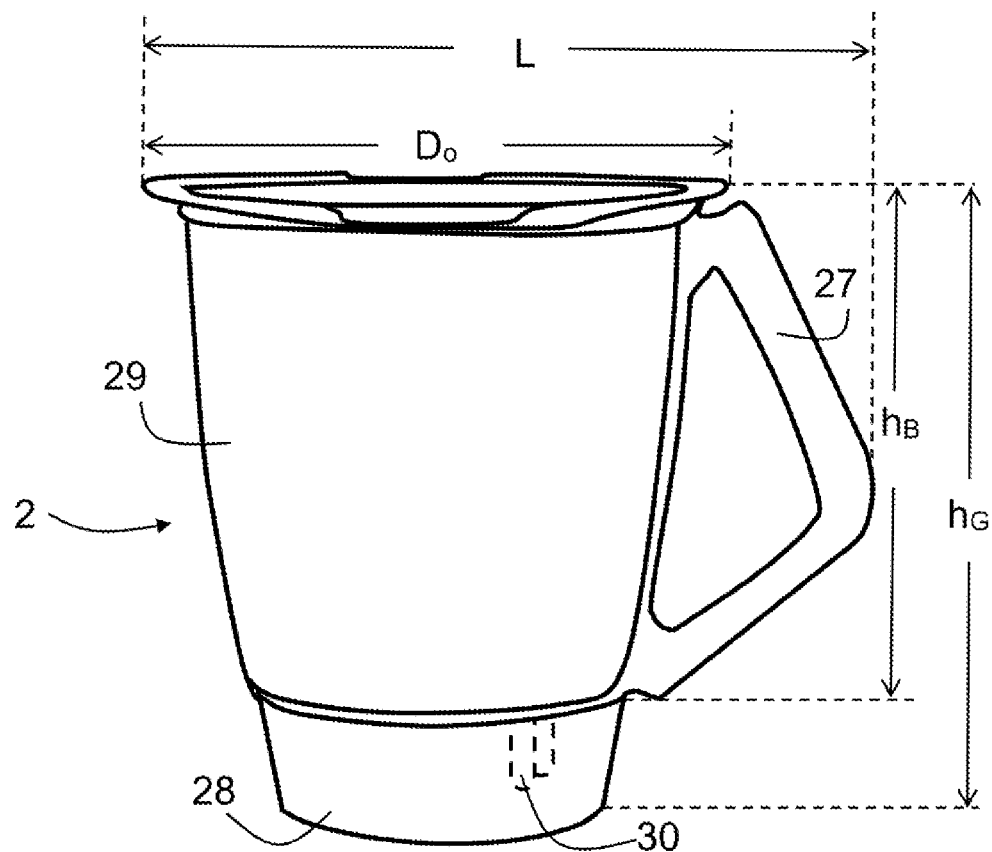
Figure 6:
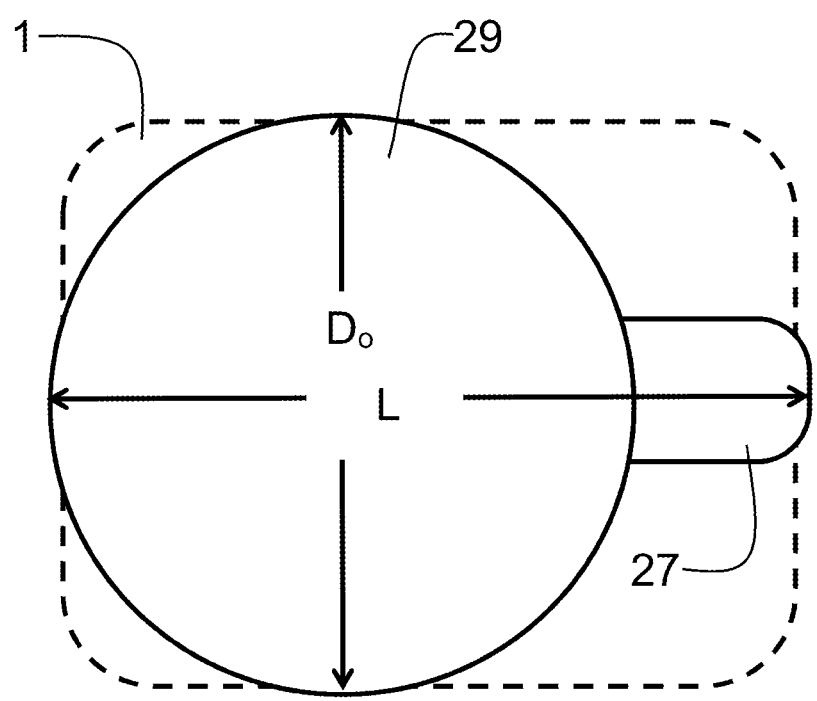
Figure 7:
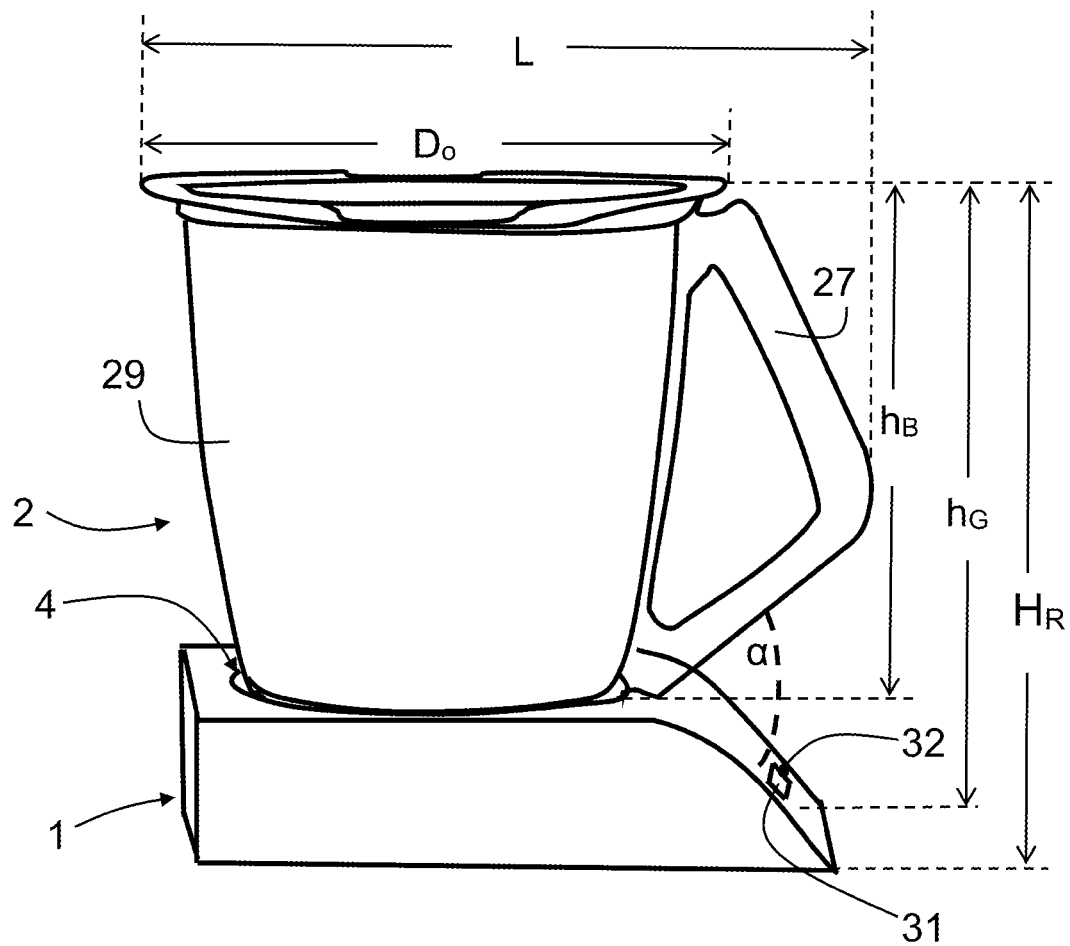
Figure 8:
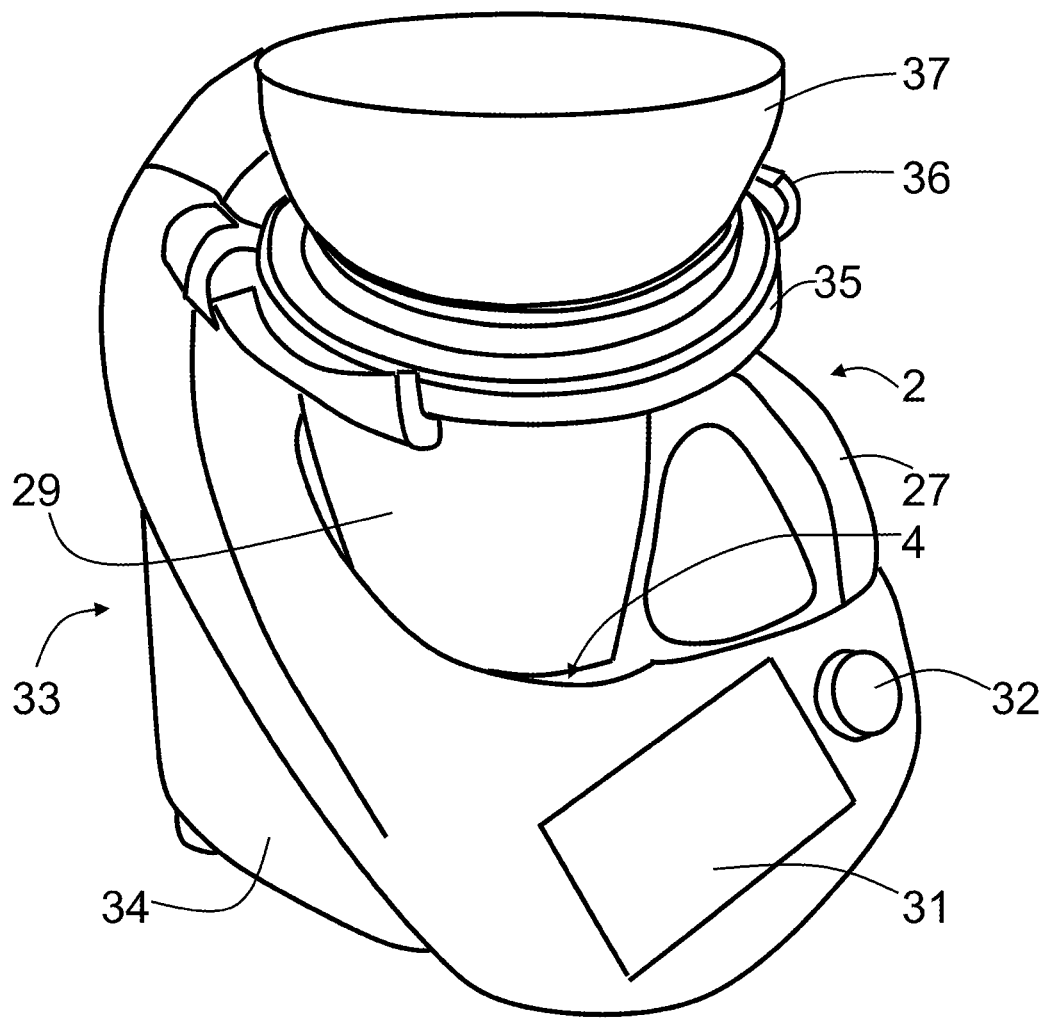
Figure 9:
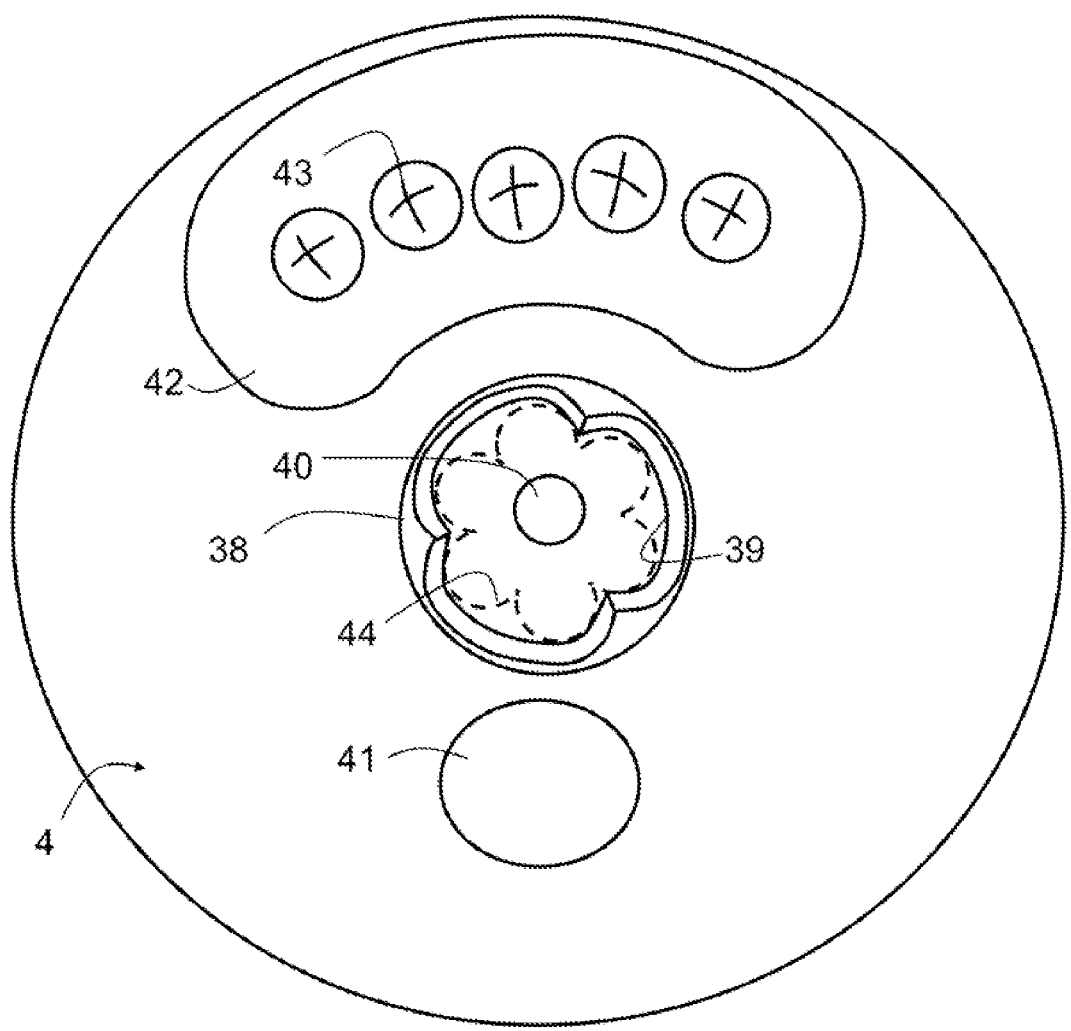

FIG. 1: mixing device with stand part and insertable vessel;

FIG. 2: mixing tool;

FIG. 3: axial section through a hybrid stepper motor;

FIG. 4: transversal section through a hybrid stepper motor;

FIG. 5: vessel for the mixing device and fort the food processor;

FIG. 6: top view of mixing device with vessel from FIG. 5;

FIG. 7: side view of mixing device from FIG. 6;

FIG. 8: food processor;

FIG. 9: top view of recess for vessel from FIG. 5.

DETAILED DESCRIPTION

FIG. 1 shows a mixing device with a stand part 1 and a vessel 2. The stand part 1 is set up on a ground 3. The stand part 1 has a recess 4, which may receive a lower portion of the vessel 2. The vessel 2 may therefore be inserted into the recess 4. The shape and diameter of the recess 4 are adapted to the shape and diameter of the lower portion of the vessel 2, in order to be able to hold the vessel 2 securely and reliably by the stand part 1. The recess may be circular, as shown in FIG. 1. The lower portion of the vessel 2 is therefore also circular so that the two shapes are adapted to each other. The outer diameter of the lower portion of the vessel 2 is slightly smaller than the inner diameter of the recess 4, so that the vessel 2 may be held securely by the stand part. However, other shapes may also be provided. Preferably, the vessel 2 may be inserted into the recess 4 in a rotationally fixed manner. Thus, the recess 4 and the lower portion of the vessel 2 may be triangular, square, pentagonal or oval so that the vessel 2 can be inserted into the stand part in a rotationally fixed manner.

A mixing tool 5 indicated by dashed lines is located in the vessel 2, namely near the bottom of the vessel 2 and thus at the base of the vessel 2. The mixing tool 5 can be rotated by a shaft 6. The shaft 6 passes through the bottom of the vessel 2. The downward pointing end of the shaft 6 comprises a coupling piece 7.

The stand part 1 comprises an electric motor 8, indicated by dashed lines, with a shaft 9. The upward pointing end of the shaft 9 comprises a coupling piece 10. The electric motor 8 is a hybrid stepper motor.

When the vessel 2 is inserted into the recess 4, as a result the two coupling pieces 7 and 10 are connected with each other. If the shaft 9 of the motor 8 is rotated, the rotational movement is transferred from the shaft 9 to the shaft 6. Thus, the mixing tool 5 is rotated. A gearbox is not necessary, because suitable speeds can be set by a hybrid stepper motor even without a gearbox.

FIG. 2 shows an example of a mixing tool 5, which has a blunt edge 11 and an opposite sharp edge 12. If the mixing tool 11 is rotated counter-clockwise as indicated by an arrow, the mixing tool 11 is rotated in the direction of the blunt edge 11. A mixing device according to the present disclosure is principally configured such that the mixing tool 11 can only be rotated in the direction of the blunt edge 11.

FIG. 3 shows an axial section through a hybrid stepper motor. FIG. 4 shows a transversal section of the hybrid stepper motor of FIG. 3. The hybrid stepper motor comprises a stator 13 and a rotor 14. The main body 15 of the stator 13 is preferably completely made of metal, so that the hybrid stepper motor has a high weight. The main body 15 of the stator 13 can consist of a number of metal sheets that are combined into a package. The metal sheets can be joined with each other by rivets.

The main body 15 comprises a plurality of segments 16. The segments 16 protrude inwardly from an annular shape of the main body 15. The outer contour of the annular shape can be circular as shown in FIG. 3. However, the outer contour of the annular shape can also be square, for example. There can be four segments 16 as shown in FIG. 4. However, there can also be six or eight segments 16, for example. Each segment 16 has a plurality of teeth 17 at its inward-facing end. Each segment 16 can have three teeth 17 as shown in FIG. 3. However, there can also be more or less than three teeth 17 per segment 16, for example, two, four, or five teeth 17. The segments with the teeth consist of a magnetizable material. It can be a ferromagnetic material, which for example contains mainly iron. However, it can also be a paramagnetic material.

A coil 18, 19 is wound around each segment 16. To ensure that the windings of coils 18, 19 are electrically insulated from the main body 15, if necessary, electrical insulation bodies 20 can be provided which electrically separate the windings of coils 18, 19 from the main body 15. During operation, at the appropriate time, a current flows through a coil 18 in the opposite direction to a current through a coil 19 to rotate the rotor. The direction of a possible current flow is indicated in FIG. 3 by a "•" and "X" representation for each coil 18, 19.

The rotor 14 is located inside the annular shape of the stator 13. The rotor 14 comprises a first rotating body 20, which is provided with first teeth 21, and a second rotating body 22 (see FIG. 4), which is provided with second teeth 23. The rotating bodies 20, 22 can be made of paramagnetic material. However, a ferromagnetic material is preferable for the rotating bodies 20, 22. One or both rotating bodies 20, 22, respectively, can consist of a plurality of metal sheets. The metal sheets of a rotating body can be connected to each other, for example by grooves or screws. Alternatively, one or both rotating body 20, 22, respectively, can be manufactured in one piece. A first tooth 21 is located between two second teeth 23 and vice versa, as shown in FIG. 3. The teeth 21, 23 of rotor 14 adjoin the teeth 17 of stator 13 in such a way that a narrow gap remains between them.

The teeth 21, 23 of the rotor 14 are preferably outwardly curved on their upper side such that the upper sides of teeth 21, 23 form an annular shape when viewed from above, as shown in FIG. 3. In a corresponding manner, the upper sides of teeth 17 of the stator are then preferably inwardly curved. This allows a particularly narrow gap to be set between the teeth 17 of the stator 13 on the one hand and the teeth 21, 23 of the rotor 14 on the other hand.

FIG. 4 illustrates that the north pole N of a permanent magnet 24 extends into the first rotating body 20 and the south pole S of the permanent magnet 24 extends into the second rotating body 22. The first teeth 21 therefore act as magnetic north pole and the second teeth 23 as magnetic south pole. As shown in FIG. 3, a first tooth 21 can be directly adjacent to a second tooth 23 when viewed in plan view, and a next first tooth 21 can be directly adjacent to the second tooth 23, so that there are no gaps between first and second teeth 21, 23 when viewed in plan view.

FIG. 3 illustrates that second teeth 23a have been moved by the teeth 17a of the upper coil 18 by reluctance force into the shown aligned position. The teeth 17a then lie exactly opposite the teeth 23a. In addition, first teeth 21a have been moved by the teeth 17b of the lower coil 19 by reluctance force into the shown aligned position. The teeth 17b then lie exactly opposite the teeth 21b. To achieve this, the current flows through the lower coil 19 in the opposite direction to the current flowing through the upper coil 18. No current flows through the side coils 18 and 19 during this time.

When the rotor 14 has reached the position shown in FIG. 3, the current flow through the upper coil 18 and the lower coil 19 is interrupted and a current then flows through the side coils 18, 19, again in the opposite direction. Since the laterally arranged teeth 17 of the stator 13 are arranged offset relative to the laterally arranged teeth 21 and 23 of the rotor 14, a reluctance force acts on the rotor 14 in such a way that it is rotated further in a counter-clockwise direction.

FIG. 4 shows that the shaft 25 of the hybrid stepper motor can pass through the permanent magnet 24 and the two rotating bodies 20, 22. FIG. 4 shows an example of the path 26 of a magnetic flux that can occur during operation of the hybrid stepper motor. The exemplary path shows that the magnetic flux penetrates the first teeth 21 and the second teeth 23. The magnetic flux passes through the first teeth 21 towards the outside of the first teeth 21. The magnetic flux passes through the second teeth 23 in an opposite direction, i.e. from the outside of the second teeth 23 towards the inside of the second teeth 23.

There is a control not shown for the hybrid stepper motor, which controls the current flow as described above.

According to FIG. 4 there is only one permanent magnet 24. However, two or more permanent magnets can also be present, which extend into the rotating bodies 20, 22.

In FIG. 5, a preferred embodiment of a vessel 2 is shown. The vessel 2 has a handle 27 made of plastic and a lower cap 28 which is open towards the bottom. The lower cap 28 is connected to the container 29, which is made of metal, by a rotary closure. The cap 28 can be detached from the container 29 by turning it. If the cap 28 is detached from the container 29 by turning it, the blending tool located in the container 29 is thereby also released and can be removed from the container 29. The cap 28 covers electrical contacts 30. The electrical contacts 30 belong to a heating device which is present at the bottom of the container 29. The total height $h_G$ of the vessel 2 can be 20 cm. The height of the vessel 29 can be 16 cm. The mixing tool is located at the base of vessel 29. The height of 16 cm is sufficient to prevent ingredients from being thrown upwardly out of the vessel 2 or the container 29 when the mixing tool is rotated at not more than 300 revolutions per minute. Mixing can therefore be carried out at this rotational speed without a lid then having to close the container 29.

The cross-section of the container 29 is essentially circular. The diameter increases from the bottom to the top. At the upper edge, the diameter $D_o$ is 20 cm. Viewed from above, the vessel 2 has a length L of 27 cm due to the handle 27. Viewed from above, the maximum width is $D_o$ 20 cm due to the diameter. Therefore, the footprint for the associated mixing device is no longer than 27 cm and no wider than 20 cm.

The container shown in FIG. 5 may be part of a mixing device according to the as well as part of a food processor. The footprint of the mixing device is then a maximum of 27 cm long and a maximum of 20 cm wide. The footprint of the food processor is significantly larger and may, for example, be up to 30 cm long and up to 30 cm wide.

If the vessel 2 is part of the food processor, the height may be 30 cm to the top of the container 29. If the vessel 2 is part of the mixing device, the height to the upper edge of the container 29 is less and may be, for example, 27 cm. This may ensure that the center of gravity of the mixing device is lower than the center of gravity of the food processor so that the mixing device can also be operated in a stable manner.

FIG. 6 shows a top view of a mixing device with a stand part 1 represented by a dashed line and a vessel inserted into the stand part 1, which comprises the container 29 and the handle 27 shown in FIG. 5. FIG. 6 clarifies that the length and width of the footprint of the stand part 1 are slightly smaller than the length L and the diameter $D_o$. Thus, only slightly more space is required in a kitchen for placing the mixing device compared to the vessel shown in FIG. 5. Since a plurality of vessels are regularly required for cooking anyway, this design does not cause any major additional space problems in a kitchen.

FIG. 7 shows a side view of the mixing device of FIG. 5. The handle 21 of the vessel 2 extends at its underside for a short distance into a recess in the housing of the stand part 1. This supports the correct alignment of the vessel 2 inserted into the stand part 1 and contributes to a rotationally fixed connection between the stand part 1 and the vessel 2. The electrical contacts 30 (see FIG. 5) on the underside of the container 9 are then plugged into electrical sockets of the stand part 1. This also ensures that the vessel 2 is inserted in the stand part 1 in a rotationally fixed manner. The associated heating device can then be supplied with power by the stand part 1 in order to be able to heat the container 29 even during mixing.

The control panel of the stand part 1 comprises a display 31 and a button 32, which may also be rotated. By pushing the button 32, an operating state may be changed, which can then be shown on the display 31. By rotating the button 32, rpm for the mixing tool or the temperature for heating the container 29 can be set. The operation and arrangement of controls correspond to the operation and arrangement of controls on the food processor, which facilitates the operation of both devices. The food processor then also has a display and a rotatable button to set at least the rpm of the mixing tool and the temperature.

The control panel with the display 31 and the rotatable button 32 is located on a ramp-shaped portion of the stand part 1, which allows for easy operation. The underside of the handle 27 forms an angle α of more than 600 with the ramp-shaped portion. This allows the control panel to remain readily accessible. In addition, the handle 27 can be grasped from the side of the control panel, which also facilitates handling. Handle 27 and control panel are therefore on the same side for handling reasons when the vessel 2 is inserted in the stand part 1.

The height $H_R$ of the mixing device to the upper edge of the vessel of the container 29 is lower than the height of the food processor to the top of the vessel of the container 29. This provides a favorable center of gravity for the mixing device, which contributes to trouble-free operation.

There are preferably various accessories for the vessel 2 such as a cooking insert, a top container such as a Varoma® container, an insert bottom for the top container, a mixing attachment, in order to be able to prepare many different foods. The cooking insert is a container with screen-shaped walls that can be inserted into the vessel 2, leaving a space between the bottom of the cooking insert and the mixing tool. Subsequently, in one configuration, the vessel 2 can be closed with a lid. A top container is a container that may be placed on top of the vessel 2. The top container may, for example, be placed on a lid of the vessel 2. Then the lid comprises an opening through which steam may flow from the vessel 2 into the top container. Hot steam may enter the top container via a grid structure of the bottom of the top container for cooking. The top container may be longer and/or wider than the maximum diameter of the vessel 2. The top container may comprise a lid. An insert bottom for the top container is a bottom that may be inserted into the top container such that the top container is then divided into two distinct levels. The insert bottom may have a screen structure to be permeable to steam. A mixing attachment is an attachment for the mixing tool. The mixing attachment may therefore be placed on the mixing tool. If the mixing attachment is placed on the mixing tool, then the mixing tool and mixing attachment can be rotated together, for example to be able to whip cream.

FIG. 7 shows that the vessel 2 protrudes freely from the stand part 1. This means that only a lower portion of the vessel 2—as can be seen in FIG. 7—extends into the recess 4. Otherwise, the vessel 2 is not additionally held. This also contributes to a small installation space. Free standing is possible due to the low rpm.

FIG. 8 shows a food processor 33 with a stand part 34. The footprint of the stand part 33 is larger than the maximum length and width of the inserted vessel 2 having the container 29 and the handle 27. The stand part comprises a rotatable button 32 and a display 31 by means of which the food processor 33 may be operated. A lid 35 is placed on the container 29 of the vessel 2. The food processor 33 comprises claws 36 of a motor-driven locking mechanism for locking the lid 35, which may lock the lid 35 by a rotational movement in such a way that it cannot be removed. A top container 37 is placed on the lid 35. Steam may flow into the top container 37 through an opening in the lid 35 and through a grid structure in the bottom of the top container 37. The top container 37 may be closed by a lid in order to cook ingredients in the top container 37 using steam.

FIG. 8 illustrates that the vessel 2 does not protrude freely from the stand part 34 of the food processor. This means that not only a lower portion of the vessel 2 extends into the recess 4. The vessel 2 is additionally held, particularly in the locked state of the lid 35. This also allows very high rotational speeds.

FIG. 9 shows a top view into the recess 4 of the stand part of the mixing device. Coupling element 38 is present at the base of recess 4. The coupling element is firmly connected to the shaft of the electric drive of the mixing device located behind it. The electric drive may therefore rotate the coupling element 38. Coupling element 38 has a recess with three lateral indentations 39 and an annular trough 40 in the center of the coupling element.

Inside the recess 4, there is a channel 41 at the base through which a liquid may run downward out of the stand part of the mixing device. Behind an elastic membrane 42 there are electrical contacts in the form of sockets. Above the electrical contacts, there are slots 43 in the membrane 42 through which electrical plugs of the vessel can be inserted in order to be connected to the sockets. There are a total of five electrical contacts for supplying current to the heating device of the vessel as well as for a sensor system in order to be able to control the heating of the vessel. By controlling the vessel can be brought to desired temperatures.

The shaft of the mixing tool has a coupling element, which, however, has six projections 44 as indicated by a dashed line in FIG. 9. The projections 44 extend into the recesses 39 in pairs when the vessel is inserted into the recess 4. The coupling element with the six projections 44 can therefore be inserted into the coupling element with the three indentations 38 in such a way that the two coupling elements are then connected to each other in a rotationally fixed manner. A rotational movement of the coupling element with the indentations 38 then rotates the mixing tool. The number of indentations 38 may also be larger or smaller. Accordingly, the number of projections 44 on the coupling element of the mixing tool then changes in such a way that projections 44 can extend into the indentations 39 in pairs. Since the maximum torque that the mixing device is capable of delivering is small, the number of indentations may be small compared to the number of protrusions. However, the smaller number of indentations advantageously increases the flexibility for interaction with other coupling elements in order to be able to use the stand part of the mixing device in other ways.

The shaft of the mixing tool may extend into the trough 40 so as to facilitate centering.

The food processor 33 shown in FIG. 8 comprises a coupling element with six indentations at the base of its recess 4, when the coupling element of the mixing tool has six projections 44. The number of indentations and projections may also be larger or smaller. A projection 44 of the coupling element of the mixing tool extends into each indentation at the coupling element of the food processor when the vessel 2 is inserted into the recess 4 of the food processor. This makes it possible to transmit a particularly large torque to the mixing tool. This may be necessary in the case of the food processor. Otherwise, the base of the recess 4 in the case of the stand part 34 of the food processor 33 may correspond to the base of the recess 4 shown in FIG. 9.

The maximum possible rotational speed at which the food processor can rotate the mixing tool is preferably at least five times greater than the maximum possible rotational speed at which the mixing device can rotate the mixing tool. For example, if the mixing device can rotate the mixing tool with up to 1000 revolutions per minute, then the food processor can rotate the mixing tool with at least 5000 revolutions per minute.

Stand part means a part of the mixing device or food processor that is intended to be placed on a ground, for example on a countertop. A stand part can therefore have protruding knobs on its underside, for example. The knobs contact the ground in the set-up state. The knobs can be made of an elastomer to enable non-slip set-up of the stand part and to dampen vibrations.

Preferably, the maximum possible rotational speed at which the food processor can rotate the mixing tool is at least ten times greater or even at least 20 times greater than the maximum possible rotational speed at which the mixing device can rotate the mixing tool.

In order to be able to keep the installation space for the stand part of the mixing device particularly small, the mixing device is preferably designed such that the maximum possible rotational speed of the mixing tool is 1000 revolutions per minute, at which the mixing device can rotate the mixing tool. If this rpm is not exceeded, a stepper motor, for example, can be used as the drive. The shaft of the stepper motor can typically be rotated at a rotational speed of 1000 revolutions per minute without its torque then being too low for the applications. A gearbox is not required in this embodiment. Advantageously, the construction height of the mixing device can also be kept small. This results in a low center of gravity, which is particularly important for the mixing device for trouble-free operation because the stand part of the mixing device is comparatively small and therefore relatively light compared to the stand part of the food processor.

Preferably, the maximum possible rotational speed at which the mixing device can rotate the mixing tool is not more than 400 revolutions per minute. In relation to the usual construction heights of vessels used in food processors, it is then not necessary to close the vessel of the mixing device (which can also be the vessel of the food processor) tightly with a lid so that no ingredients of a food can be ejected from the vessel. A locking mechanism for a lid can therefore be dispensed with in the mixing device. The lid can then be removed from the vessel of the mixing device at any time, for example by lifting it. This means that a locking mechanism does not have to be unlocked first before the lid can be removed.

Usual construction heights for the vessel are between 10 cm and 30 cm. If the distance between the top edge of the vessel and the bottom of the vessel is at least 10 cm, this is regularly sufficient to ensure that ingredients of a food are not ejected by rotating the stirrer tool if the rotational speed does not exceed 400 revolutions per minute. Preferably, the distance between the top edge of the vessel and the bottom of the vessel is at least 15 cm.

If the vessel stands on a ground, the bottom of the vessel can have a distance to the ground. The total height of the vessel is then greater than distance between the upper edge of the vessel and the bottom of the vessel. This embodiment allows electrical contacts, for example, to be provided below the bottom. Electrical contacts can be connected to a sensor of the vessel. The sensor may be a temperature sensor to be able to measure the temperature of the vessel. Electrical contacts can be connected to a heating device of the vessel. Electrical current can then be conducted via the electrical contacts to the heating device for heating the vessel.

By means of a locking mechanism, a lid can be locked when the lid closes the vessel. Then, the lid can not be removed from the vessel. If such a locking mechanism is not present in the mixing device because it is not required, this can additionally contribute to keep the installation space for the stand part of the mixing device small. This is especially true compared to the case where the food processor comprises a motor-driven locking mechanism for the lid. A motor-driven locking mechanism requires particularly large installation space. Being able to dispense with the same locking mechanism in the mixing device saves a particularly large amount of space in the stand part of the mixing device.

Preferably, the food processor comprises a motor-driven locking mechanism for the lid of the vessel. A motor-driven locking mechanism is advantageous in order to be able to prepare a food in an at least partially automated manner. Then, locking and unlocking can be realized in an automated manner by a control of the food processor. This embodiment of the present disclosure is therefore of particular advantage if a motor-driven locking mechanism is provided as the locking mechanism in the case of the food processor and a locking mechanism is not present in the mixing device for a lid of the vessel.

The lid can have an opening. Ingredients such as spices can then be brought into the vessel through the opening when the lid otherwise closes the vessel. The diameter of the opening may be, for example, 1 cm to 8 cm when the diameter of the lid is 15 cm to 25 cm.

In particular, the maximum possible rotational speed at which the mixing device can rotate the mixing tool is no more than 220 revolutions per minute. This ensures that the ingredients of a food are hardly ever thrown upwards during mixing. Upwardly thrown ingredients, which may then stick to the inner wall of the vessel, do not participate in the mixing process. This problem is avoided by limiting the number of revolutions to 220 revolutions per minute. Higher numbers of revolutions are not necessary, since the food processor is available for higher numbers of revolutions. It has also been found that for parallel food preparation, there is rarely a need to rotate at more than 220 revolutions per minute simultaneously using two different pieces of equipment. This finding is another reason why limiting the maximum possible rotational speed to 220 revolutions per minute is particularly advantageous.

Preferably, the maximum possible rotational speed with which the food processor can rotate the mixing tool is at least 5000 revolutions per minute, particularly preferably at least 8000 revolutions per minute, in order to be able not only to mix but also to chop. Preferably, the maximum possible rotational speed at which the food processor can rotate the mixing tool is no more than 16000 revolutions per minute, particularly preferably no more than 13000 revolutions per minute, as the technical effort would then be too high compared to the benefit.

In one embodiment of the present disclosure, the rpm of the rotational speed of the food processor and/or the mixing device can be continuously adjusted. Thus, if the maximum possible rotational speed in the case of the mixing device is 200 revolutions per minute, this rotational speed can be continuously reduced to zero. If the maximum possible rotational speed in the case of the food processor is 12000 revolutions per minute, for example, this rotational speed can be continuously reduced to zero.

However, it is preferable that the rpm of the rotational speed of the food processor and/or the mixing device can only be adjusted in a stepped manner. In this way, operation can be kept simple. Operating errors can be reduced. For the preparation of food, it is also not necessary to be able to adjust rotational speeds continuously.

In order for the mixing device to be operated particularly easily without the fear of operating errors, preferably a maximum of three, preferably a maximum of two different rotational speeds can be set for the mixing device. In one embodiment of the present disclosure, for example, the rotational speed in a first step is between 80 and 120 revolutions per minute and the rotational speed in a second step is between 180 and 220 revolutions per minute.

Preferably, there are the same steps for the rotational speed in the food processor and in the mixing device. If, for example, mixing is to take place according to a recipe using a step 1, then in this embodiment it is not important to which device this specification refers if the step 1 in the food processor corresponds to the step 1 in the mixing device. Thus, if there is a step 1 in the mixing device with a number of revolutions that is between 80 and 120 revolutions per minute, then there is also a step 1 in the food processor with a number of revolutions that is between 80 and 120 revolutions per minute. If there is a step 2 in the mixing device with a number of revolutions of between 180 and 220 revolutions per minute, then there is also a step 2 in the food processor with a rotational speed of between 180 and 220 revolutions per minute. Equal steps for the rotational speed does not mean that the rotational speeds of a step 1 or a step 2 have to be exactly the same. Actually, small differences of up to 20%, for example, are not harmful for the preparation of food. As a rule, differences are even to be preferred in order to achieve acoustic advantages, for example. For example, resonance frequencies are to be avoided by this. These can be different because food processor and mixing device are constructed differently. For this reason, it is possible, for example, for the food processor to mix at 100 revolutions per minute in step 1 and for the mixing device to mix at only 80 revolutions per minute in step 1, in order to achieve acoustic advantages, for example.

The control for the rotational speeds and the drive for the mixing tool are located in the respective stand part. The stand part of the mixing device can then be configured such that it can only be rotated with a step 1 and a step 2. The stand part of the mixing device can be configured such that it can only be rotated with a step 1, a step 2 and a step 3. The stand part of the mixing device can be configured to rotate only with a step 1, only with a step 2 or only with a step 3. The stand part of the food processor can be configured such that it can be rotated with a step 1, a step 2, a step 3, a step 4, etc.

The rotational speed of the lowest step 1 should be at least 50 revolutions per minute, since lower rotational speeds are of too little use.

In principle, the number of steps for the rotational speed in the case of the food processor is greater than the number of steps for the rotational speed in the case of the mixing device. Preferably, the number of steps in the case of the food processor is at least twice as large, particularly preferably at least three times as large. Thus, if there are two steps for the rotational speed in the case of the mixing device, for example the previously described step 1 and step 2, then there are at least four steps for the rotational speed in the case of the food processor, particularly preferably at least six steps for rotational speeds.

Preferably, the lowest step, i.e. the step for the lowest rotational speed, in the aforementioned sense is the same for the food processor and the mixing device. The previously described step 1 can be the lowest step, i.e. the step with the lowest rotational speed. Both the mixing device and the food processor can then be operated at step 1. A lower rotational speed, which is different from zero, is then not possible for both devices.

In the food processor, therefore, there are generally more than three steps for the rotational speed, for example at least eight steps, particularly preferably at least 10 steps. However, a subdivision into more than 40 steps is generally not provided, since in practice there is no need for even more precise subdivisions. If there are the same steps for the rotational speed in the food processor and the mixing device, the food processor in particular also comprises steps for the rotational speed which are not present in the mixing device. This is especially true if the stand part of the food processor can rotate at a higher rotational speed compared to the stand part of the mixing device. Then there are one or more additional steps in the food processor, which are not present in the mixing device, in order to be able to rotate the mixing tool by means of these additional steps with correspondingly higher rotational speeds. However, one or more additional steps in the food processor can also be such that the mixing tool can be rotated at lower speeds. The food processor can then rotate the mixing tool at a lower speed than the mixing device.

In the case of the food processor, for example, the rotational speed can increase exponentially from step to step. In the case of food processor, a merely linear increase from step to step has not proven effective for preparing foods in practice. For example, it can be rotated at a rotational speed between 80 and 120 revolutions per minute for step 1, at a rotational speed between 180 and 220 revolutions per minute for step 2, at a rotational speed between 470 and 530 revolutions per minute for step 3, and at a rotational speed between 10,000 and 12,000 revolutions per minute for the last step.

In one embodiment, the mixing tool is equipped with a pressure safety device. In this embodiment, there is a threshold value for a torque that the mixing tool can transmit from its drive to ingredients of a food. If the threshold value of the torque is exceeded at least for a predetermined period of time, the pressure safety device has the effect that the shaft of the drive can rotate without the mixing tool rotating at the same speed. If, for example, the rotation of the mixing tool is blocked for e.g. 5 seconds, the pressure safety device has the effect that the shaft of the drive can rotate after the period of 5 seconds has elapsed without the mixing tool then also being rotated. In this way, damage to the drive of the food processor and/or the drive of the mixing device is avoided if the mixing tool is blocked. The pressure safety device can be a burst safety device. Thus, the pressure safety device can have a predetermined breaking point that breaks when the threshold value for the torque is exceeded for a predetermined period of time. Following the breaking of the predetermined breaking point, there is then, for example, no rotationally fixed connection between the shaft of the mixing tool and the tool of the mixing tool. If the shaft of the mixing tool is then driven, it can be rotated independently of the mixing tool.

Preferably, for safety reasons, the stand part of the mixing device has a control for limiting a torque for its drive even if the mixing tool comprises a pressure safety device. The control limits the power of the electric drive to a maximum value. For example, the control may be configured such that it maintains a constant rpm of the mixing tool by regulating the amperage for the electric drive, but limits the maximum possible amperage to, for example, 0.8 A or 1 A. The maximum current value and, thus, the maximum torque value are generally selected so that the mixing device can mix ingredients of a food only with a small torque compared to the torque with which ingredients of a food can be processed in the case of the food processor. It is taken into account that for a mixing generally only small torques are to be used for the preparation of a food. The maximum possible torque can be 0.5 N*m, for example.

Preferably, the stand part of the mixing device has a switch-off device. The switch-off device switches off the power supply for the electric drive in an automated manner when the aforementioned maximum value for the current intensity or for the torque is reached or is reached at least for a predetermined period of time. The period of time can be, for example, two to ten seconds, such as five seconds. If the aforementioned maximum value is then reached for five seconds, the shutdown device switches off the power supply for the electric drive in an automated manner.

Preferably, for safety reasons, the switch-off device then switches off not only the power supply for the electrical drive in an automated manner, but also the power supply to other consumers of electrical energy.

Another electrical consumer may be an electrical heating device of the mixing device by means of which the vessel can be heated. The vessel may then comprise a heating device and electrical contacts. A stand part of the mixing device may then comprise corresponding electrical contacts. If the vessel is inserted into the stand part of the mixing device, the electrical contacts of the mixing device are then connected to the electrical contacts of the vessel. Current can then be supplied from the stand part of the mixing device to the heating device, thereby heating the vessel.

The stand part of the food processor can also have the same electrical contacts in order to be able to heat the vessel.

If the mixing tool has a pressure safety device, then the maximum value for the aforementioned power limitation is selected to be so small that it cannot trigger the pressure safety device. It is taken into account that it should be possible to provide higher torques for preparing food, for example for kneading dough using the food processor. However, the mixing device is not suitable for kneading dough due to its power limitation.

In order to meet safety requirements particularly well, the torque that the mixing device can apply by means of its mixing tool is a maximum of 1 N*m, preferably a maximum of 0.5 N*m. Particularly preferably, the maximum torque is no more than 0.4 N*m, so that the mixing device can even be operated without lid without any safety concerns standing in the way. The vessel of the mixing device is then open at the top during operation.

In order to be able to mix with sufficiently high force, a control for limiting a torque is designed such that the torque of the mixing tool can be at least 0.1 N*m, preferably at least 0.2 N*m, particularly preferably at least 0.3 N*m. This ensures that common ingredients of a food can be mixed by the mixing device with the required force.

In one embodiment of the present disclosure, the torque of the mixing tool of the food processor can be more than 2 N*m, for example at least 2.5 N*m or 3 N*m. Such a torque allows, for example, kneading of dough.

Preferably, in particular the footprint of the stand part of the mixing device is smaller than the footprint of the stand part of the food processor. In a kitchen, it is particularly important to keep the footprint small that is needed to accommodate kitchen appliances. Therefore, it is of particular advantage that the footprint of the stand part of the mixing device is small compared to the footprint of the stand part of the food processor.

Footprint means the area required to place the stand part of the food processor or the stand part of the mixing device on a ground, for example on a countertop in a kitchen.

Length and width of the footprint of the stand part of the mixing device are preferably hardly larger, especially preferably not larger, than the maximum length and the maximum width of the vessel as seen in top view of the vessel and/or the mixing device. For the reasons mentioned above, there is often a need for a second vessel for the operation of the food processor anyway. In these cases in particular, the stand part of the mixing device requires virtually no additional space.

The length and width of the footprint of the stand part of the mixing device preferably correspond to the maximum length and width of the vessel. On the one hand, this minimizes the additional space required for the stand part of the mixing device. On the other hand, the footprint is then maximized so that sufficient stability can be achieved for the mixing device during operation.

The footprint of the stand part of the mixing device can be up to 35 cm long in order to keep the space requirement suitably low. The footprint of the stand part of the mixing device can be up to 25 cm wide to keep the space requirement low. The footprint of the stand part of the mixing device should be at least 20 cm long in order to achieve sufficient stability. The footprint of the stand part of the mixing device should be at least 15 cm wide in order to achieve sufficient stability.

Indeed, one vessel is sufficient for the operation of the system. In practice, however, two vessels are often already available simply to be able to prepare a plurality of foods in parallel with the food processor without great effort. A second footprint must be provided for a second vessel. If the second vessel can be inserted not only in the stand part of the food processor but also in the stand part of the mixing device, then the presence of the mixing device does not have the effect of increasing the footprint required in any case to a practically relevant extent.

In one embodiment, the construction height of the mixing device is smaller than the construction height of the food processor. Since the stand part of the mixing device has a comparatively small footprint, the lower construction height is of particular advantage because it allows for a particularly low center of gravity. The low center of gravity contributes to stability and thus to trouble-free operation.

In particular, the upper edge of the vessel in the case of the mixing device has a smaller distance to the underside of the mixing device compared to the case where the vessel is part of the food processor. This also contributes to a comparatively low center of gravity in the case of the mixing device.

In one embodiment, the system comprises a second vessel which is configured like the aforementioned vessel. If a food is first prepared in the first-mentioned vessel by means of the food processor and the vessel is later used in the mixing device as described above, the second vessel can be used to prepare another food in parallel by means of the food processor, for example.

The stand part of the food processor is preferably configured such that the direction of rotation of the mixing tool can be changed. The food processor can thus be used in an improved manner for pure mixing and alternatively for mixing and chopping ingredients of a food.

The stand part of the mixing device and/or the stand part of the food processor can comprise an electronic control. The operation of the food processor and/or the operation of the mixing device can be controlled by the control if a control is present.

Preferably, the stand part of the mixing device and the stand part of the food processor are configured such that they can exchange data wirelessly with each other. Data exchange can be used to control a coordinated operation of the mixing device or the food processor by means of a control. Wireless exchange between the stand parts is possible, for example, via Bluetooth®.

The food processor and/or the mixing device can have a heating device as a device for preparing a food, with which the vessel can be heated. The stand part of the food processor and/or the stand part of the mixing device may comprise a control by means of which the heating of the vessel can be controlled. The heating device may comprise an electrical resistance heater to be able to generate heat. The heating device may comprise a temperature sensor to be able to detect, display and/or control temperatures. The control may be such that the vessel can be brought to a selected temperature and maintained at that temperature. The stand part of the food processor and/or the stand part of the mixing device may be configured such that a temperature can be continuously selected and adjusted.

The stand part of the food processor and/or the stand part of the mixing device can be configured such that a temperature can only be selected and set in a stepped manner. This embodiment is preferable in order to keep operation simple and to avoid operating errors. For example, the temperature may be set in steps of 5° C., for example starting with a temperature of 25° C. or 30° C. Preferably, the lowest temperature that can be set at the stand part of the food processor and the stand part of the mixing device is the same. For example, the lowest temperature that can be set at both stand parts can be 25° C. or 30° C. If the temperatures of both stand parts can only be changed in a stepped manner, the steps are preferably the same for both stand parts. Thus, if a temperature can be changed in 5° C. steps in the case of the food processor, the temperature can then also only be changed in 5° C. steps in the case of the mixing device. This consistency ensures that the temperature can be set in the same way in both devices. This facilitates the parallel preparation of food according to recipes.

Preferably, the maximum temperature that can be set for the stand part of the mixing device is lower than the maximum temperature that can be set for the stand part of the food processor. Since the vessel is generally less protected in the case of the mixing device, it is advantageous for safety reasons if the maximum temperature for the mixing device is lower than for the food processor.

Preferably, the vessel comprises a resistance heater as part of the heating device. This reduces the technical effort if a heating device is to be provided for both the food processor and the mixing device. Preferably, the vessel comprises a temperature sensor to detect, display and/or control temperatures.

As a device for preparing a food, the food processor and/or the mixing device may be provided with a scale with which the weight of an ingredient or food brought into the vessel can be weighed. The food processor and/or the mixing device may comprise a control with which the scale and thus the weighing can be controlled. Preferably, only the food processor comprises a scale together with the associated control, in order to be able to keep the installation space for the mixing device particularly small.

As a device for preparing a food, the food processor and/or the mixing device may be provided with an optical sensor with which an ingredient brought into the vessel can be monitored optically. The vessel may comprise the optical sensor. The food processor and/or the mixing device may comprise a control by means of which the optical sensor and thus the optical monitoring can be controlled. An optical sensor and control can be present only at the stand part of the food processor in order to keep the installation space for the mixing device particularly small.

The present disclosure also relates to a stand part of the mixing device for the system. The stand part may thus be part of the system. The stand part of the mixing device may be designed as previously described.

The stand part of the mixing device may have a recess which may be suitable to receive a lower portion of the vessel. The shape and diameter of the recess may correspond to the shape and diameter of the lower portion of the vessel, in order to securely and reliably hold the vessel in a desired position by the stand part. The lower portion may have a height that is no more than 30%, preferably no more than 25%, of the total height of the vessel. For example, if the vessel is 20 cm high, then the height of the lower portion may be limited to 20:3 cm or 20:4 cm. The lower portion may also have a height that is no more than 35% of the overall height of the vessel.

The stand part of the mixing device comprises an electric drive by means of which the mixing tool located in the vessel can be driven. The electric drive can comprise a stepper motor. A stepper motor is particularly suitable for use in the mixing device, as the mixing tool is only to be rotated at low rpm compared to the rotational speeds of a food processor. The mixing tool can therefore be directly connected to the shaft of the stepper motor. The installation space can therefore be small, so that the additional space required for the stand part of the mixing device can be small.

Preferably, the electric drive of the mixing device is a hybrid stepper motor. A hybrid stepper motor can only be rotated at a relatively low rpm. Since the mixing device is only intended as a supplement to take over mixing tasks, only low rpm are even advantageous for safety reasons.

A hybrid stepper motor has also proved suitable because its torque is low in relation to its weight, which is also advantageous for safety reasons. A further advantage is that the torque does not or hardly depend on the rpm in the relevant rpm range. Thus, the torque of a commercially available hybrid stepper motor does not change or at least does not change in a practically relevant way in the rpm range from 50 to 500 revolutions. rpm from 50 to 500 revolutions are sufficient for the present application. The torque can then be, for example, at least 0.2 N*m or 0.3 N*m and/or not more than 0.4 N*m. For example, the torque may be 0.35 N*m.

A hybrid stepper motor is comparatively heavy, especially compared to a piezo stepper motor. Because the electric drive is housed in the stand part of the mixing device, the hybrid stepper motor contributes to a relatively high weight of the stand part. A relatively high weight of the stand part of the mixing device is advantageous to provide stability during operation. However, the stand part of the mixing device can be small compared to the stand part of the food processor. This can avoid excessive space problems in a household.

The electric drive is located generally below the vessel when the vessel is inserted into the stand part of the mixing device and when the stand part is set up as intended.

The electric drive may comprise a plurality of permanent magnets. Preferably, however, the electric drive comprises a rotor with only one permanent magnet. The assembly effort can thus be kept particularly low.

Preferably, the electric drive comprises a stator with an annular shape and a rotor within the annular shape. This design is particularly suitable for connecting a shaft of the electric drive to the mixing tool.

Preferably, segments having teeth project inwardly from the annular shape. A coil is wound around each segment. The rotor comprises outwardly projecting magnetically poled teeth.

Preferably, teeth of the stator may be exactly opposite teeth of the rotor. At the same time, other teeth of the stator may be offset from other teeth of the rotor.

Preferably, the rotor comprises first teeth and second teeth. The first teeth are a magnetic north pole or are passed through by a first magnetic flux of a magnet. The second teeth are a magnetic south pole or are passed through by a second magnetic flux of a magnet in the opposite direction compared to the first magnetic flux. Thus, a first tooth may be formed by the north pole of a permanent magnet. A second tooth may be formed by the south pole of a permanent magnet. However, a magnet may also be adjacent to the first and second teeth such that the magnetic flux generated by the magnet passes through the first and second teeth. The magnetic flux through the first teeth then runs in reverse to the magnetic flux through the second teeth. For example, the first teeth then act like a magnetic north pole. The second teeth then act like a magnetic south pole. The first and second teeth are then magnetically poled in the sense of the present disclosure.

First and second teeth generally form the outer circumference of the rotor. A first tooth is generally located between two second teeth and vice versa.

The rotor preferably comprises a first rotating body made of ferromagnetic material, which is provided with the first teeth. The rotor preferably comprises a second rotating body made of ferromagnetic material provided with the second teeth. The north pole of a permanent magnet preferably extends into the first rotating body. The south pole of the permanent magnet preferably extends into the second rotating body.

The teeth of the rotor are preferably outwardly curved at their upper side. The teeth of the stator are preferably inwardly curved on their upper side.

The mixing tool preferably comprises a blunt edge and an opposite sharp edge. The mixing device is configured such that the mixing tool can only be rotated in the direction of the blunt edge. By configuring the mixing device such that the mixing tool can only be rotated in the direction of the blunt edge, an undesired chopping of a food or of the ingredients of a food is avoided. Besides, this contributes to the safety of the mixing device. The mixing tool has an opposite sharp edge, so that the vessel with the mixing tool can also be used in a food processor. By means of the food processor which can rotate the mixing tool in the opposite direction, the ingredients of a food can then be chopped.

The electric drive may be connected to the mixing tool by a releasable coupling. A coupling element of the releasable coupling may be attached to the shaft of the drive. A coupling element of the releasable coupling may be attached to the shaft of the mixing tool. The releasable coupling is located below the vessel bottom when the vessel is inserted into the recess of the stand part. In this embodiment, the vessel can be easily detached from the stand part. In such an embodiment, the vessel can be operated particularly easily both with the stand part and with a suitably configured food processor. The coupling element which is attached to the shaft of the mixing tool, is then located below the bottom of the vessel.

Preferably, the coupling element of the stand part of the mixing device differs from the coupling element of the stand part of the food processor. However, both coupling elements are such that they can be connected to the coupling element of the vessel in such a way that a rotary movement can be transmitted from the coupling element of the respective stand part to the blending tool (mixing tool). The coupling element at the stand part of the mixing device differs from the coupling element at the stand part of the food processor such that the coupling element at the stand part of the mixing device can also be inserted differently. Differences are present so that only the coupling element of the food processor may be configured such that it can transmit very high torques. The coupling element at the stand part of the food processor is therefore optimized for the transmission of high torques. The coupling element of the stand part of the mixing device is optimized for variable applications.

Preferably, the releasable coupling can be released by a linear movement parallel to the motor shaft. The vessel can then be advantageously released from the stand part of the mixing device by lifting the vessel, i.e. moving it upwards away from the stand part of the mixing device.

Preferably, the weight of the stand part is at least 1.5 kg, preferably at least 2 kg, so that it can be sufficiently stable. The weight of the stand part is preferably no more than 3 kg so that the weight is not unnecessarily high. Ideally, the weight of the stand part is between 2 kg and 2.5 kg. The food processor may have a stand part with a much higher weight. The weight of the stand part of the food processor can be at least twice or even at least three times as high as the stand part of the mixing device, so that the food processor is stable even at very high rotational speed. The weight of the stand part of the food processor can be more than 3 kg, preferably more than 4 kg. The weight of the stand part of the food processor is preferably not more than 10 kg, particularly preferably not more than 8 kg, in order to avoid unnecessarily high weights.

The stand part of the mixing device can have electrical contacts for heating the vessel, which are connected to electrical contacts on the underside of the vessel when the vessel is inserted into the recess. The stand part of the mixing device may comprise a control by means of which a temperature for heating the vessel can be set. Preferably, the temperature that can be set is limited to 150° C., more preferably 125° C., for safety reasons. Preferably, the temperature that can be set by the stand part of the mixing device is lower than the temperature that can be set in the case of the food processor. This embodiment is also based on the idea that a particularly high temperature is only required for a few cases of food preparation, so that very high temperatures do not have to be reached with the mixing device. Thus, the maximum temperature in the case of the mixing device can be limited to 125° C. and the maximum temperature in the case of the food processor can be limited to 160° C.

The stand part of the mixing device may comprise a rotatable button for setting a temperature. Preferably, the stand part of the food processor also comprises a rotatable button for setting the temperature. This avoids conversion difficulties when the vessel is removed from the food processor and inserted into the stand part of the mixing device or vice versa.

The stand part of the mixing device may comprise a rotatable button for setting a rotational speed. Preferably, the stand part of the food processor also comprises a rotatable button for setting the rotational speed. This avoids conversion difficulties when the vessel is removed from the food processor and inserted into the stand part of the mixing device or vice versa.

The stand part of the mixing device may comprise a display for indicating operating states. Preferably, the stand part of the food processor then also comprises a display for indicating operating states. This avoids conversion difficulties when the vessel is removed from the food processor and inserted into the stand part of the mixing device or vice versa.

If the stand part of the food processor and the stand part of the mixing device comprise both a rotatable button for setting a temperature and/or for setting a rotational speed and a display, then the position of the rotatable button relative to the position of the display is preferably the same for both stand parts. Conversion difficulties can thus be avoided. For example, the rotatable button can be arranged to the right of the display and adjacent to the display on both stand parts.

If the stand part of the mixing device is configured such that it can heat the vessel, the mixing device may also be used for other purposes by means of accessories, such as for cooking or simmering of foods or food ingredients. For example, a top container may be provided that can be placed on the vessel to enable steam cooking with the mixing device. A cooking insert may be provided, which may be hooked into the vessel in order to be able to cook, for example.

The stand part of the mixing device and the stand part of the food processor preferably have an equally acting or at least substantially equally acting control for heating the vessel. This means that a food in the vessel may be heated at the same rate regardless of whether the vessel is placed in the stand part of the mixing device or in the stand part of the food processor. For example, there is one liter of liquid in the vessel, the vessel is inserted into one of the mentioned stand parts and the stand part has been set, for example, such that the liquid is heated to a maximum of 90° C. The temperature of 90° C. is then reached in the vessel after setting, for example 300 seconds+/−10%, i.e. +/−30 seconds later, regardless of whether the vessel has been inserted into the stand part of the mixing device or into the stand part of the food processor. The heating curves are then also the same or at least essentially the same. Thus, if the temperature of 50° C. is reached after 150 seconds+/−10%, then this applies to both stand parts mentioned. Preferably, the heating curves do not differ by more than +/−10%, further preferably by no more than +/−5%, particularly preferably by no more than +/−3%.

The invention claimed is:

1. A food preparation system, the system comprising
   a stand part of a food processor,
   a stand part of a mixing device, and
   at least one vessel with a mixing tool located therein,
   wherein the at least one vessel is configured to be mounted to either the food processor or the mixing device so as to provide both part of the food processor and part of the mixing device, and
   wherein the maximum possible rotational speed at which the stand part of the food processor is configured to rotate the mixing tool is at least five times greater than the maximum possible rotational speed at which the stand part of the mixing device is configured rotate the mixing tool.

2. The system of claim 1, wherein the maximum possible rotational speed the stand part of the mixing device is configured to rotate the mixing tool to 1000 revolutions per minute.

3. The system of claim 2, wherein the stand part of the food processor is configured rotate the mixing tool to at least 5000 revolutions per minute.

4. The system of claim 3, wherein the stand part of the food processor is configured to rotate the mixing tool at not more than 15000 revolutions per minute.

5. The system of claim 1, further comprising a lid configured to close the at least one vessel and a locking mechanism configured to retain the lid in place relative to the at least one vessel when the vessel is mounted on the stand part of the food processor.

6. The system of claim 5, wherein the system lacks any lock feature configured to retain the lid in place relative to the at least one vessel when the vessel is mounted on the stand part of the mixing device.

7. The system of claim 6, wherein at least one of the stand part of the food processor and the stand part of the mixing device is configured in such a way that the rotational speeds for the mixing tool can be adjusted only in a stepped manner.

8. The system of claim 7, wherein the stand part of the mixing device is configured to provide no more than three adjustable steps for the rotational speed for the mixing tool.

9. The system of claim 8, wherein the stand part of the food processor is configured to provide more than three adjustable steps for the rotational speed for the mixing tool.

10. The system of claim 9, wherein there are same step intervals for setting a rotational speed in the stand part of the food processor as in the stand part of the mixing device so that a user can select equivalent rotational speeds for at least some speeds available to the stand part of the food processor and the stand part of the mixing device.

11. The system of claim 1, wherein the mixing tool comprises a pressure safety device that provides means for decoupling the mixing tool from rotation with a drive included in one of the food processor and the mixing device in response to motion of the mixing tool exceeding predetermined thresholds.

12. The system of claim 1, wherein the stand part of the mixing device comprises a control for limiting the torque for an included drive.

13. The system of claim 12, wherein the stand part of the mixing device has a recess sized to receive at least a portion of the at least one vessel, and an electric drive for rotating the mixing tool present in the at least one vessel, wherein the stand part of the mixing device is configured such that the stand part can rotate the mixing tool present in the at least one vessel at not more than 300 revolutions per minute, and wherein the torque with which the mixing tool can be rotated by the stand part of the mixing device can be not more than 0.4 N*m.

14. The system of claim 13, wherein the stand part of the mixing device comprises electrical contacts for heating the vessel, which are configured to be connected to electrical contacts on the underside of the at least one vessel when the at least one vessel is inserted into the recess, and means for setting a rotational speed for the mixing tool and a temperature for heating the at least one vessel.

15. The system of claim 13, wherein the electric drive comprises a stepper motor.

16. The system of claim 1, wherein at least one of the stand part of the food processor and the stand part of the mixing device is configured in such a way that the rotational speeds for the mixing tool can be adjusted only in a stepped manner.

17. The system of claim 16, wherein the stand part of the mixing device is configured to provide no more than three adjustable steps for the rotational speed for the mixing tool.

18. The system of claim 17, wherein the stand part of the food processor is configured to provide more than three adjustable steps for the rotational speed for the mixing tool, and wherein there are same step intervals for setting a rotational speed in the stand part of the food processor as in the stand part of the mixing device so that a user can select equivalent rotational speeds for at least some speeds available to the stand part of the food processor and the stand part of the mixing device.

* * * * *